US010997281B2

(12) United States Patent
Fukuda et al.

(10) Patent No.: US 10,997,281 B2
(45) Date of Patent: May 4, 2021

(54) INFORMATION PROCESSING DEVICE, BIOMETRIC AUTHENTICATION METHOD, AND RECORDING MEDIUM RECORDING BIOMETRIC AUTHENTICATION PROGRAM

(71) Applicant: FUJITSU LIMITED, Kanagawa (JP)

(72) Inventors: Mitsuaki Fukuda, Sagamihara (JP); Takahiro Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 245 days.

(21) Appl. No.: 16/226,859

(22) Filed: Dec. 20, 2018

(65) Prior Publication Data
US 2019/0213308 A1 Jul. 11, 2019

(30) Foreign Application Priority Data
Jan. 5, 2018 (JP) .............................. JP2018-000712

(51) Int. Cl.
  G06K 9/00 (2006.01)
  G06F 21/32 (2013.01)
  G06K 9/62 (2006.01)

(52) U.S. Cl.
  CPC ......... *G06F 21/32* (2013.01); *G06K 9/00892* (2013.01); *G06K 9/00926* (2013.01); *G06K 9/6215* (2013.01); *G06K 9/6255* (2013.01)

(58) Field of Classification Search
  CPC .. G06F 21/32; G06K 9/00926; G06K 9/6215; G06K 9/00892; G06K 9/6255
  USPC ....................................................... 382/115
  See application file for complete search history.

(56) References Cited

U.S. PATENT DOCUMENTS

| 9,723,000 | B1* | 8/2017 | Daniel | ............... H04L 63/0876 |
| 2002/0048390 | A1* | 4/2002 | Ikegami | ............... G06K 9/0008 382/124 |
| 2008/0056544 | A1* | 3/2008 | Aikawa | ............. G06K 9/00885 382/124 |
| 2010/0060417 | A1* | 3/2010 | Niinuma | ............ G06K 9/00093 340/5.82 |
| 2010/0097179 | A1* | 4/2010 | Hayashida | .............. G06F 21/32 340/5.82 |

(Continued)

FOREIGN PATENT DOCUMENTS

| JP | 2010-061528 | 3/2010 |
| JP | 2011-242957 | 12/2011 |
| JP | 2012-027657 | 2/2012 |

*Primary Examiner* — Van D Huynh
(74) *Attorney, Agent, or Firm* — Fujitsu Patent Center

(57) ABSTRACT

An information processing device includes: a memory; and a processor configured to, store, for each user, narrowing data and confirming data, which are associated with each other, as registration data in the memory, obtain candidates having a fewer number than a number of the users by collating the narrowing data extracted from collating biometric data acquired from a person to be authenticated with the narrowing data of each user in the memory, confirm a specific candidate from the candidates in response to respective pieces of similarity between the confirming data extracted from the collating biometric data and the confirming data of the registration data related to the candidates in the memory, and register the narrowing data extracted from the collating biometric data in the registration data of the specific candidate in a case where the similarity of the specific candidate is equivalent to or more than a threshold value.

20 Claims, 16 Drawing Sheets

(56) References Cited

U.S. PATENT DOCUMENTS

2015/0154437 A1* 6/2015 Aoki .................... G06K 9/6201
382/124

* cited by examiner

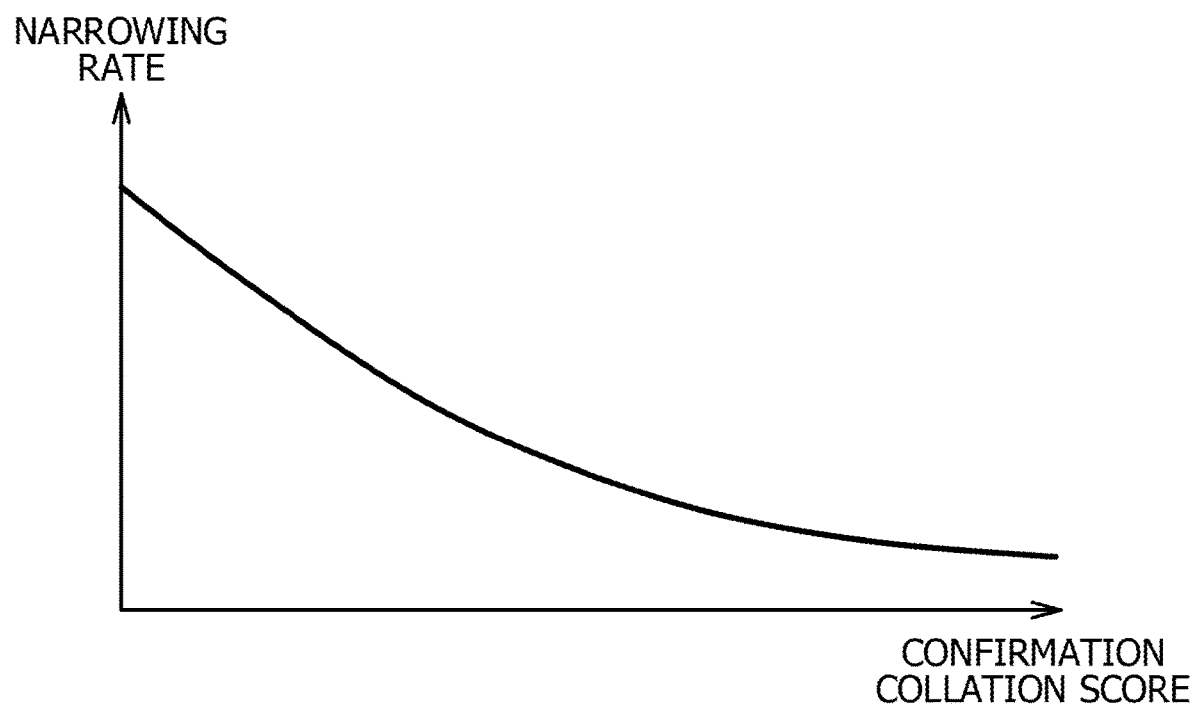

FIG. 15

| NARROWING DATA SCHEME | PRIORITY |
|---|---|
| SCHEME A | 100 |
| SCHEME B | 050 |
| SCHEME C | 020 |
| SCHEME D | 010 |

INFORMATION PROCESSING DEVICE, BIOMETRIC AUTHENTICATION METHOD, AND RECORDING MEDIUM RECORDING BIOMETRIC AUTHENTICATION PROGRAM

CROSS-REFERENCE TO RELATED APPLICATION

This application is based upon and claims the benefit of priority of the prior Japanese Patent Application No. 2018-712, filed on Jan. 5, 2018, the entire contents of which are incorporated herein by reference.

FIELD

The embodiments discussed herein are related to an information processing device, a biometric authentication method, and a recording medium recording a biometric authentication program.

BACKGROUND

In biometric authentication, who the person is is authenticated without presentation of an ID or an input of the ID by keys but only by presenting a living body to a sensor (1:N authentication).

Examples of related art are disclosed in Japanese Laid-open Patent Publication No. 2010-61528, Japanese Laid-open Patent Publication No. 2012-27657, or Japanese Laid-open Patent Publication No. 2011-242957.

SUMMARY

According to an aspect of the embodiments, an information processing device includes: a memory; and a processor coupled to the memory and configured to, store, for each of users, narrowing data and confirming data, which are associated with each other, as registration data in the memory, obtain candidates having a fewer number than a number of the users by collating the narrowing data extracted from collating biometric data which is acquired from a person to be authenticated with the narrowing data of each of the users in the memory, confirm a specific candidate from the candidates in response to respective pieces of similarity between the confirming data which is extracted from the collating biometric data and the confirming data of the registration data related to the candidates in the memory, and register the narrowing data extracted from the collating biometric data in the registration data of the specific candidate in a case where the similarity of the specific candidate is equivalent to or more than a threshold value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram that exemplifies the relationship between a confirmation collation score and a narrowing rate;

FIG. 15 is a diagram that exemplifies priority of each collation scheme; and

DESCRIPTION OF EMBODIMENTS

Figure 1:
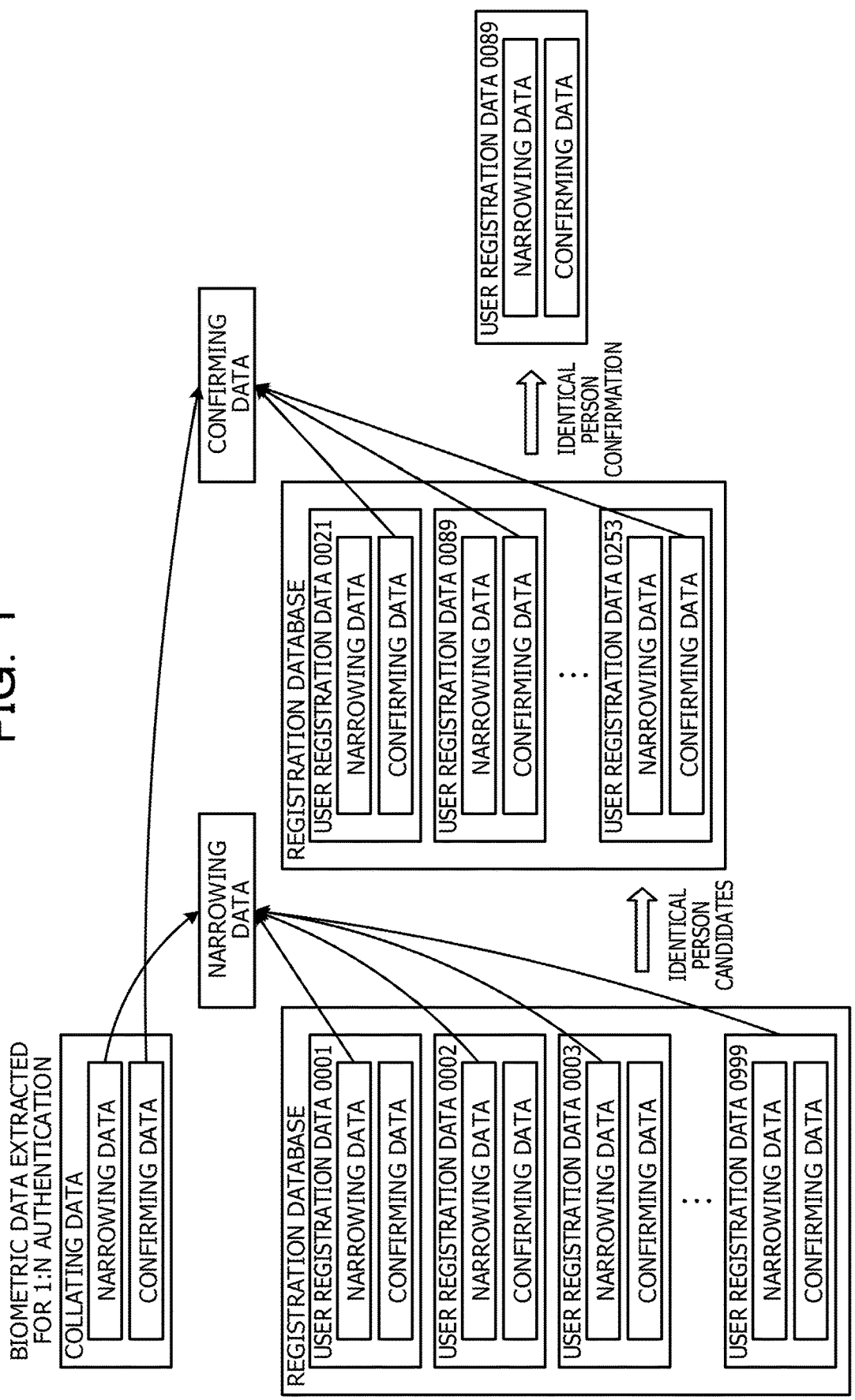
FIG. 1 is a diagram that exemplifies a narrowing process.

For example, in 1:N authentication, because a user may not be specified by an ID, comparison and collation with biometric templates of plural registered persons are performed. When biometric data for narrowing are registered in addition to the biometric templates, the biometric templates as comparison targets are narrowed based on mutual similarity among narrowing data, and authentication time is thus shortened.

For example, when registered users increase, the number of sets of biometric data for narrowing also increases, and the time requested for narrowing becomes long. As a result, authentication time becomes long. When the narrowing rate is intentionally reduced, the number of biometric templates as comparison targets may be reduced. However, the biometric template of an identical person is likely to be excluded, and a false rejection rate may rise. For example, authentication precision may be lowered.

For example, a biometric authentication device and so forth may be provided which improve authentication precision.

As the biometric authentication in which biometric information is used to perform identical person confirmation, 1:1 biometric authentication may be raised. In the 1:1 authentication, the user as an authentication target is limited to one person by presentation of an individual ID card or an input of a user ID by keys. Next, whether the person with the ID is confirmed by collating presented biometric characteristic data with previously registered biometric characteristic data (biometric template). Because the user is limited to one person by presentation of the ID card or the like before performance of the biometric authentication, only collation about data of one person is sufficient for the biometric authentication, and the biometric authentication may be made in a comparatively short time. However, because this is a procedure in which presentation of the ID card or an input of the ID by keys and the biometric authentication is thereafter performed, the authentication involves two stages of trouble.

Accordingly, requests for 1:N biometric authentication increase in which who the person is is authenticated without presentation of the user ID or an input of the ID by keys but only by presenting a living body (for example, a palm, a finger, or the like) to a sensor. In the 1:1 authentication, the target of the biometric authentication is limited to one person. However, in the 1:N authentication, the authentication target is not limited to one person. Thus, comparison and collation with many sets of biometric template data, which are previously registered, are performed.

In order to perform the 1:N authentication, for example, there are the following schemes.

(First scheme) A scheme that uses the same biometric data as the 1:1 authentication.

Exhaustive collation between the biometric data presented for collation and the biometric data of all the users registered in a database is repeated, and the registration data that indicate higher similarity than an identical person confirmation threshold value are thereby selected as identical person data.

(Second scheme) A scheme that uses narrowing biometric data for narrowing identical person candidates.

Dedicated narrowing data for narrowing the identical person candidates are stored separately from the biometric data for the 1:1 biometric authentication. A narrowing process is performed in which narrowing data generated for collation are exhaustively collated with the narrowing data in the registration data and a small number of candidates with high narrowing scores are selected based on a predetermined narrowing rate. Subsequently, collation by using the biometric data for the 1:1 authentication (hereinafter referred to as confirming data) is performed with each of the small number of extracted candidates, and a confirmation collation process is performed in which a specific candidate is confirmed as the identical person. In such a manner, the 1:N authentication is conducted by two stages: the narrowing process and the confirmation collation process. The narrowing data and the confirming data are extracted from the living body of the user based on each different biometric characteristic algorithm. An extraction algorithm that aims at capability of high-speed collation is used for the narrowing data, and an extraction algorithm that aims at enhancing authentication precision so as to decrease false determinations between the identical person and another person is used for the confirming data. For example, the narrowing data have less information amount than the confirming data and may perform collation at a higher speed than the confirming data.

The above first scheme is effective in a case where the registered users are comparatively a few. However, when the number of registered persons increases, the time requested for collation rapidly increases. Thus, the first scheme is not practical.

Consequently, when the number of registered users increases, the second scheme becomes effective. FIG. 1 is a diagram that exemplifies an outline of a process procedure of the second scheme. The second scheme goes through procedures of two stages in which candidates are extracted by using the narrowing data which may execute a collation process in a comparatively short time and a specific candidate is thereafter confirmed as the identical person by performing the confirmation collation process for the extracted candidates, and the total processing time may be kept within a practical range. The confirmation collation process of the second stage is basically the same process as the 1:1 authentication and is thus a process that comparatively consumes time. However, the candidates are narrowed to a smaller number of persons in the first stage, and the total processing time may thereby be reduced and may be kept within a practical processing time.

However, in the second scheme, as the number of registered users increases, the number of persons who are extracted as the candidates increases, and the time requested for the confirmation collation process of the second stage may thereby increase.

Accordingly, it is possible to narrow the candidates to a much smaller number of persons by the narrowing process of the first stage. In this case, the processing time for the confirmation collation process of the second stage may be shortened. However, in order not to increase false rejection errors, the narrowing rate may not carelessly be reduced. A false rejection error is an error in which the identical person is not included in a list which is extracted as identical person candidates and the identical person is determined as not being the identical person although he/she is the identical person. A narrowing rate is an index that indicates the percentage of the number of registered users to which the candidates may be narrowed.

Accordingly, it is possible to update the narrowing data to data with higher precision or to change a scheme of the narrowing data to a scheme with higher precision. In this case, the narrowing rate may be improved. The narrowing data with higher precision or the narrowing data in a new scheme, which are technically improved, have high narrowing precision and may often narrow the candidates to a much smaller number of persons. For example, supposing that the narrowing rate is 5% in a case where the narrowing data in an old scheme are used, the narrowing process narrows 1,000 registered persons to 50 persons that correspond to 5%. On the other hand, supposing that the narrowing rate is improved to 1% in the narrowing data with higher precision or the narrowing data in the new scheme, 1,000 registered persons may be narrowed to 10 persons that correspond to 1%.

When the number of narrowed candidates is small, the time for the confirmation collation process becomes short, and convenience is improved. For example, when the number of narrowed persons is decreased from 50 persons to 10 persons, the processing time for the confirmation collation process may be shortened. In simple calculation, in this example, the processing time for the confirmation collation process may be shortened to one fifth. In such a manner, a process for narrowing many sets of the registration data to a few registered candidates is an important process for executing the 1:N authentication in a processing time which enables actual operation of the 1:N authentication.

Incidentally, both of the narrowing data and the confirming data continue using the data at the time point of registration without any change or are updated by explicitly conducting a reregistration procedure. Newly performing the reregistration procedure is troublesome work for both of the users and an administrator. In a case where the authentication time becomes long when the numbers of registered users increases and where an attempt to update the narrowing data to new narrowing data is made, all the registered persons have to conduct reregistration, and trouble for that is huge.

Consequently, it is desirable to automatically perform registration such as addition and update of the narrowing data without making the users aware of the registration while the operation of a biometric authentication system is continued. In order to shorten the processing time, it is effective to shorten the time for the confirmation collation process by narrowing the candidates to a smaller number of persons. However, to do so, high quality narrowing data are requested which may perform highly precise narrowing. A method is demanded which automatically performs an update to high quality data without making the users aware of the update while an operation of an authentication system is continued. Accordingly, in the following embodiments, a description will be made about a biometric authentication device, a biometric authentication method, and a biometric authentication program that may improve authentication precision by automatically performing an update to high quality data without making the users aware of the update while the operation of the authentication system is continued.

First Embodiment

Figure 2:
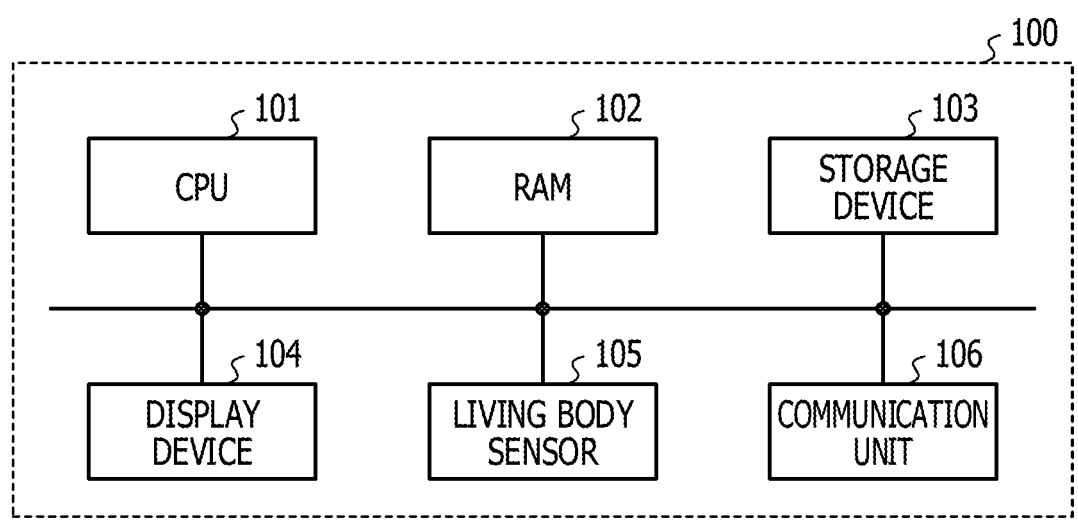
FIG. 2 is a block diagram for explaining a hardware configuration of a biometric authentication device according to a first embodiment.

FIG. 2 is a block diagram for explaining a hardware configuration of a biometric authentication device 100 according to a first embodiment. As exemplified in FIG. 2, the biometric authentication device 100 includes a CPU 101, a RAM 102, a storage device 103, a display device 104, a living body sensor 105, a communication unit 106, and so forth. Those apparatuses are connected together by a bus or the like.

The central processing unit (CPU) 101 is a central computation processing device. The CPU 101 includes one or more cores. The random access memory (RAM) 102 is a volatile memory that temporarily stores a program executed by the CPU 101, data processed by the CPU 101, and so forth.

The storage device 103 is a non-volatile storage device. As the storage device 103, for example, a read-only memory (ROM), a solid state drive (SSD) such as a flash memory, a hard disk that is driven by a hard disk drive, or the like may be used. An image processing program according to this embodiment is stored in the storage device 103. The display device 104 is a liquid crystal display, an electroluminescence panel, or the like and displays a result of each process, which will be described later.

The living body sensor 105 is a sensor that acquires biometric information of a user. The living body sensor 105 acquires a living body image from a prescribed living body site of the user. The living body sensor 105 acquires an image of modality that includes a linear pattern such as a finger print, veins, and a palm print, for example. In a case of acquiring the living body image of a finger print, the living body sensor 105 is an optical sensor, a capacitive sensor, or the like, for example. In a case of acquiring veins, a palm print, or the like, the living body sensor 105 is a complementary metal oxide semiconductor (CMOS) camera or the like.

The communication unit 106 is a connection interface with a local area network (LAN) or the like, for example.

The biometric authentication program that is stored in the storage device 103 is expanded in the RAM 102 in an executable manner. The CPU 101 executes the biometric authentication program that is expanded in the RAM 102. Accordingly, the processes by the biometric authentication device 100 are executed. The biometric authentication program is executed, and a registration process, an authentication process, and so forth are thereby executed.

The registration process is a process for registering the biometric data obtained from the biometric information acquired by the living body sensor 105 as the registration data while associating the biometric data with the respective user IDs. The registration data include the narrowing data and the confirming data that are associated with the user ID. The authentication process includes the narrowing process for narrowing the candidates by collating the narrowing data included in collating biometric data acquired by the living body sensor 105 with the narrowing data of the registration data of all the users and the confirmation collation process for confirming a specific candidate from the candidates by collating the confirming data included in the collating biometric data with the confirming data of the registration data of the narrowed candidates. In this embodiment, as one example, when the similarity between the confirming data of the collating biometric data and the confirming data of the registration data is equivalent to or more than a threshold value, a determination is made that the user is the same person as the registered user. Details of the registration process and the authentication process will be described later.

Figure 3:
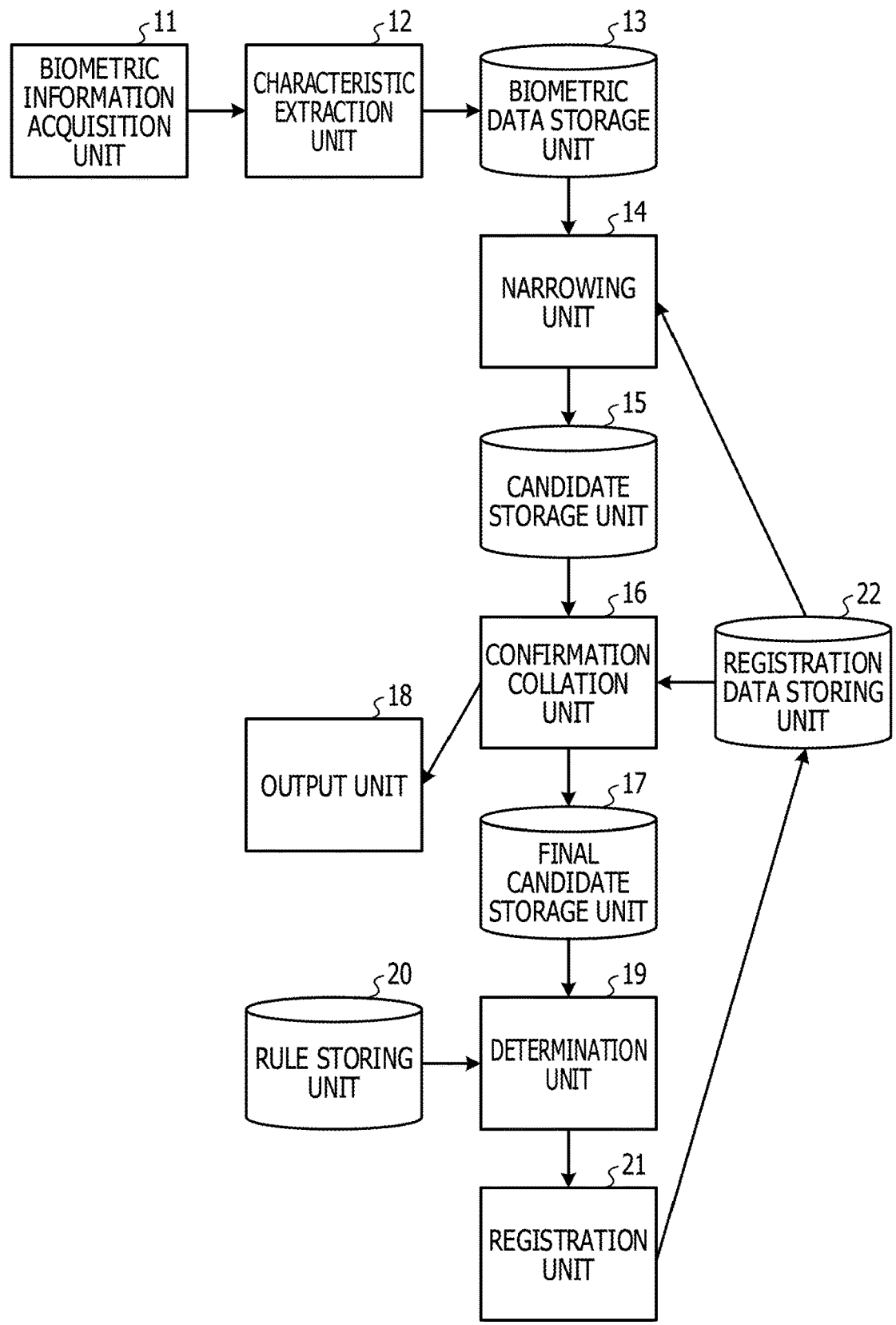
FIG. 3 is a block diagram of functions that are realized by execution of a biometric authentication program.

FIG. 3 is a block diagram of functions that are realized by execution of the biometric authentication program. The biometric authentication program is executed, and a biometric information acquisition unit 11, a characteristic extraction unit 12, a biometric data storage unit 13, a narrowing unit 14, a candidate storage unit 15, a confirmation collation unit 16, a final candidate storage unit 17, an output unit 18, a determination unit 19, a rule storing unit 20, a registration unit 21, a registration data storing unit 22, and so forth are thereby realized. The examples in FIG. 2 and FIG. 3 are configured with stand-alone terminals. However, embodiments are not limited to those. For example, this embodiment is also applicable to a system of a client server. In this embodiment, for simplification of description, an example in a stand-alone terminal will be described.

Figure 4:
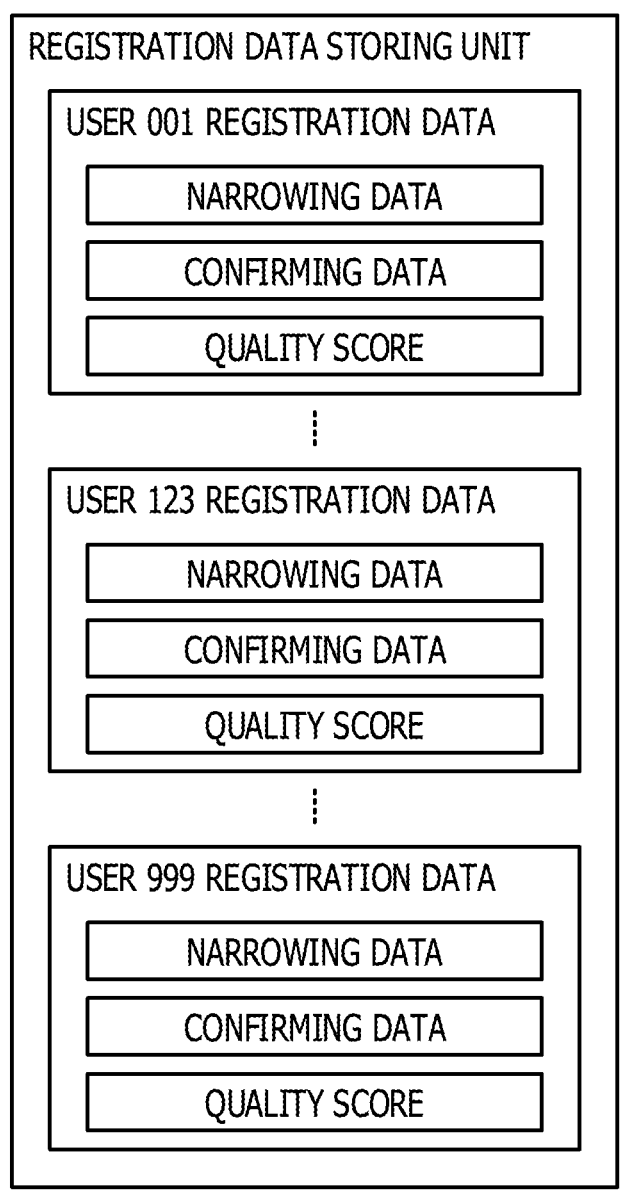
FIG. 4 is a diagram that exemplifies registration data that are stored in a registration data storing unit.

FIG. 4 is a diagram that exemplifies the registration data that are stored in the registration data storing unit 22. As exemplified in FIG. 4, as for the registration data stored in the registration data storing unit 22, the narrowing data, the confirming data, and quality scores are stored while being associated with the respective user IDs. The narrowing data and the confirming data are in advance acquired from each of the users. The quality score will be described later.

(Authentication Process)

Figure 5:
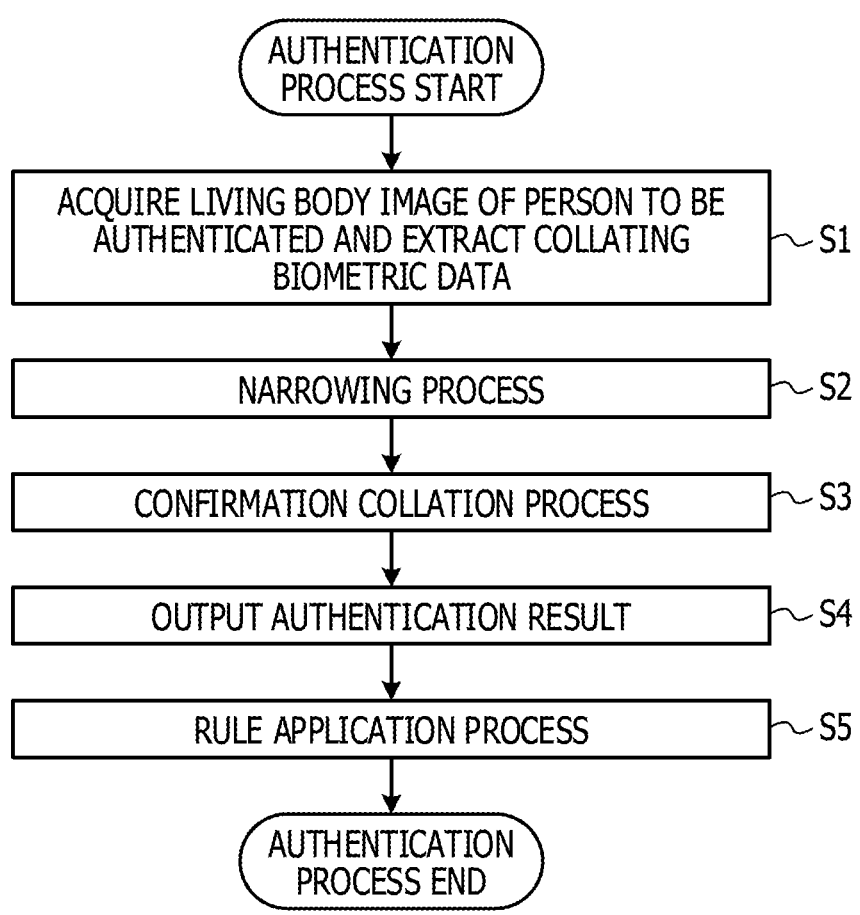
FIG. 5 is a flowchart that exemplifies an authentication process.

FIG. 5 is a flowchart that exemplifies details of the authentication process. In the following, the authentication process will be described with reference to FIG. 3 to FIG. 5. First, the biometric information acquisition unit 11 acquires a living body image or the like of a living body site of a person to be authenticated from the living body sensor 105. Next, the characteristic extraction unit 12 extracts a biometric characteristic as the collating biometric data from the living body image (step S1). The collating biometric data are temporarily stored in the biometric data storage unit 13.

Next, the narrowing unit 14 extracts the narrowing data from the collating biometric data stored in the biometric data storage unit 13, collates the narrowing data with the narrowing data stored in the registration data storing unit 22, and thereby extracts the candidates (step S2). For example, among the narrowing data of the registration data, the user ID, which is associated with the data whose similarity to the narrowing data of the collating biometric data is equivalent to or more than a threshold value, is extracted as the candidate. Alternatively, the narrowing data of the registration data are sorted in the descending order of similarity, and the user ID, which is associated with the narrowing data extracted in accordance with a predetermined narrowing rate, may thereby be extracted as the candidate. The extracted candidate is temporarily stored in the candidate storage unit 15.

Next, the confirmation collation unit 16 extracts the confirming data from the collating biometric data stored in the biometric data storage unit 13, reads in the confirming data related to the candidates among the confirming data stored in the registration data storing unit 22, and performs collation (step S3). For example, the confirmation collation unit 16 confirms that the person to be authenticated is the user related to the confirming data whose similarity is equivalent to or more than a prescribed value. Accordingly, the confirmation collation unit 16 confirms that a specific candidate from the candidates is the person to be authenticated.

Next, the output unit 18 outputs information of the specific candidate who is confirmed as an authentication result (step S4).

Next, the determination unit 19 determines whether or not the similarity used in confirming the specific candidate (hereinafter referred to as confirmation collation score) complies with a rule stored in the rule storing unit 20. In a case where a determination is made that the confirmation collation score complies with the rule, the registration unit 21 registers the narrowing data of the collating biometric data in the registration data related to the specific candidate (step S5). The above processes are performed, and the flowchart of FIG. 5 is then finished.

Figure 6:
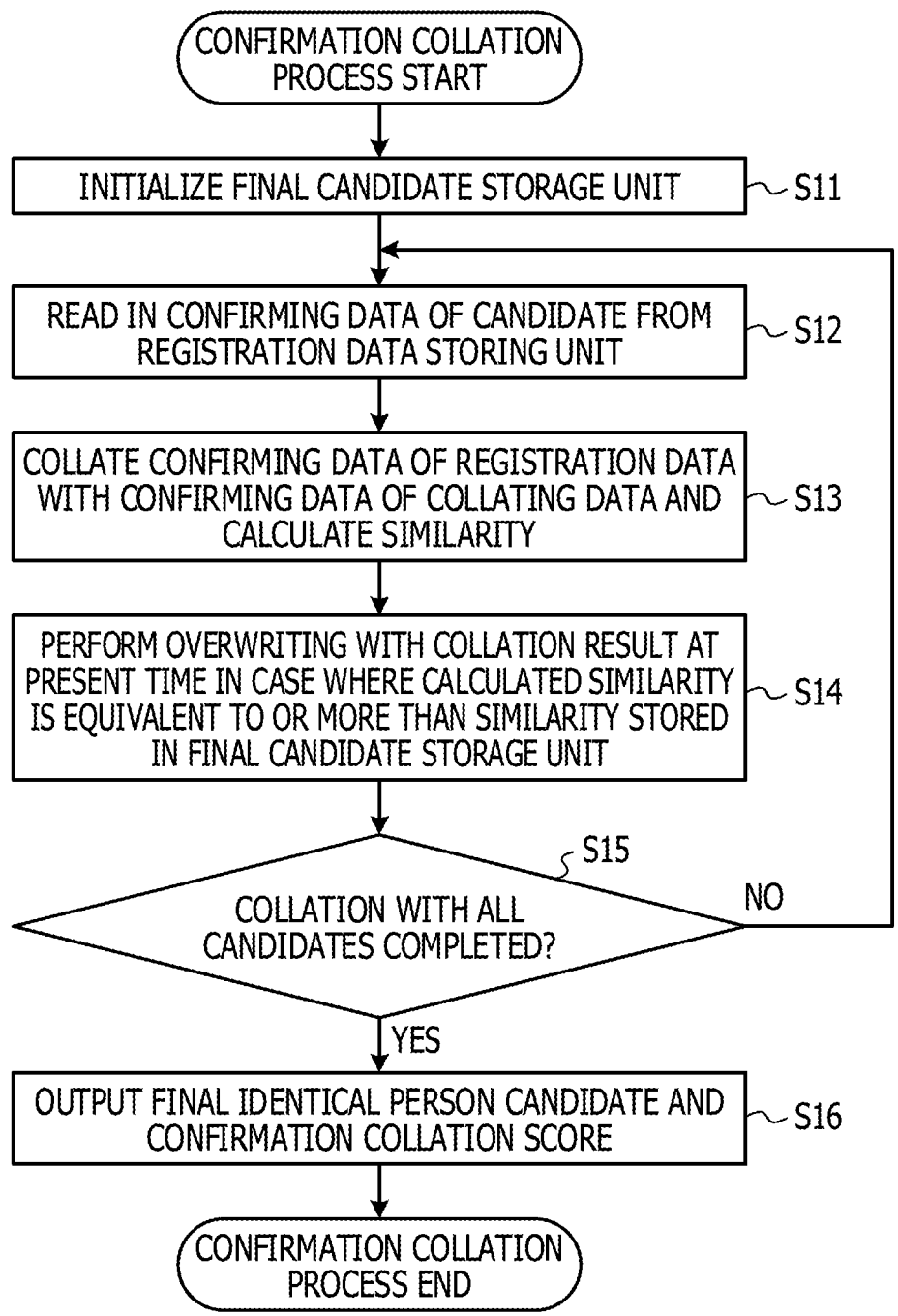
FIG. 6 is a diagram that exemplifies a flowchart which illustrates step S3 and step S4 in FIG. 5.

FIG. 6 is a diagram that exemplifies a flowchart which illustrates details of step S3 and step S4 in FIG. 5. As exemplified in FIG. 6, the confirmation collation unit 16 initializes the final candidate storage unit 17 (step S11). The final candidate storage unit 17 is a memory region that stores the user IDs and pieces of similarity. Next, the confirmation collation unit 16 reads in the confirming data associated with any of the candidates stored in the candidate storage unit 15 from the registration data storing unit 22 (step S12).

Next, the confirmation collation unit 16 collates the confirming data that are read in with the confirming data extracted from the collating biometric data and calculates the similarity (step S13). Next, in a case where the similarity calculated in step S13 is higher than the similarity stored in the final candidate storage unit 17, the confirmation collation unit 16 overwrites the information of the final candidate storage unit 17 with the higher similarity and the user ID related to the higher similarity (step S14). In a case where information is not yet stored in the final candidate storage unit 17, the confirmation collation unit 16 does not overwrite but stores the similarity calculated in step S13 and the user ID related to the similarity.

Next, the confirmation collation unit 16 determines whether or not collation with the confirming data associated with all the candidates stored in the candidate storage unit 15 is completed (step S15). In a case where a determination in step S15 is "No", the process is again executed from step S12. In a case where the determination in step S15 is "Yes", the output unit 18 outputs a final identical person candidate stored in the final candidate storage unit 17 as the specific candidate, outputs the ID of the specific candidate as a confirmation ID, and outputs the similarity stored in the final candidate storage unit 17 as the confirmation collation score (step S16).

Figure 7:
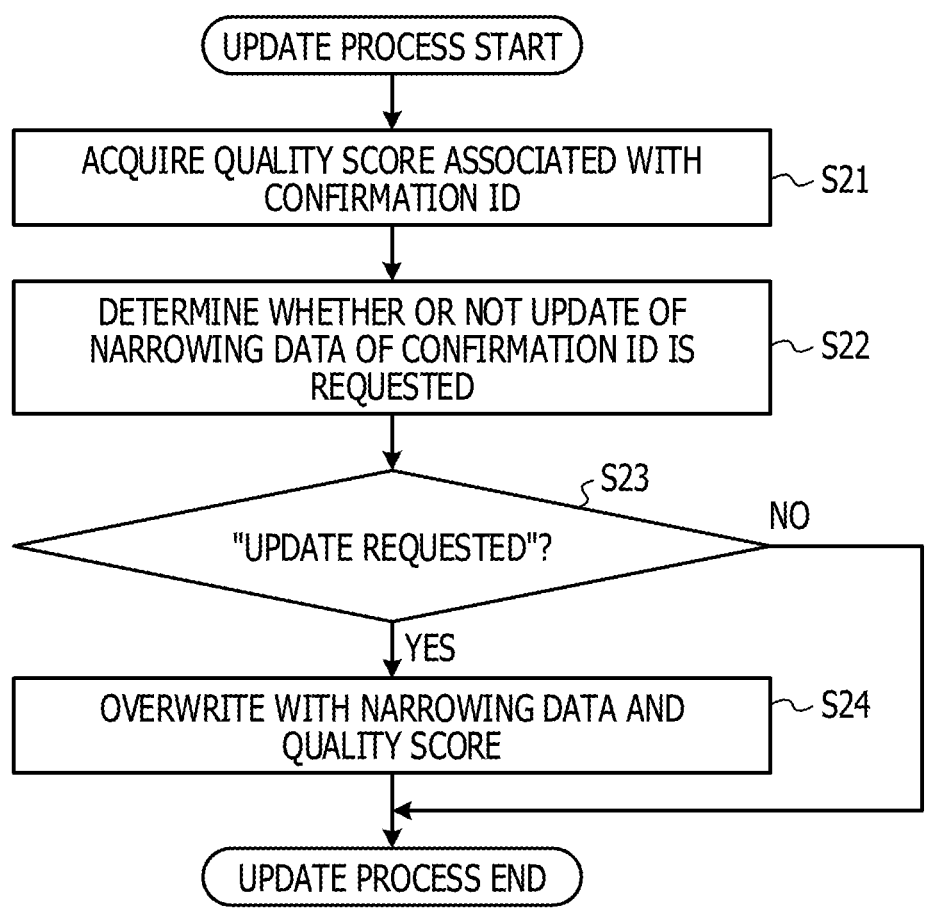
FIG. 7 is a diagram that exemplifies a flowchart which illustrates step S5 in FIG. 5.

FIG. 7 is a diagram that exemplifies a flowchart which illustrates details of step S5 in FIG. 5. As exemplified in FIG. 7, the determination unit 19 acquires the quality score that is associated with the confirmation ID output in step S16 in FIG. 6 from the registration data storing unit 22 (step S21).

Next, the determination unit 19 applies the confirmation collation score and the quality score acquired in step S21 to the rule stored in the rule storing unit 20 and determines whether or not an update of the narrowing data of the registration data of the confirmation ID is requested (step S22). For example, in a case where the confirmation collation score is equivalent to or more than the quality score, a determination is made that the update is "requested".

Next, the determination unit 19 determines whether or not the determination about whether or not the update of the narrowing data is requested is "requested" (step S23). In a case where a determination in step S23 is "No", the flowchart of FIG. 7 is finished. In a case where the determination in step S23 is "Yes", the registration unit 21 overwrites the registration data of the confirmation ID with the narrowing data extracted from the collating biometric data and overwrites the confirmation collation score with the quality score (step S24). The flowchart is thereafter finished.

In this embodiment, the narrowing data of the registration data are updated in a case where the confirmation collation score is equivalent to or more than a threshold value. Because the collating biometric data have high quality in a case where the confirmation collation score is equivalent to or more than the threshold value, the narrowing data extracted from the collating biometric data also have high quality. Accordingly, precision of the narrowing process is improved. As a result, authentication precision is improved. Because the narrowing data are updated in a course in which the user performs a normal authentication process, a new procedure may not separately be performed. Consequently, convenience is improved.

In the above example, the narrowing data are updated in a case where the confirmation collation score is equivalent to or more than the quality score. However, embodiments are not limited to this. For example, the narrowing data to be a target are updated, the narrowing rate in a case where the narrowing process is conducted by using the narrowing data is estimated, and an update may be performed in a case where the estimated narrowing rate is equivalent to or less than a predetermined threshold value.

For example, a narrowing rate p that is expressed by the following formula (1) is calculated from the confirmation collation score, and an update may be performed in a case where the narrowing rate p is equivalent to or more than a predetermined threshold value. The relationship of the following formula (1) may be obtained by making a table or the like from relationship data as in FIG. 8, which are obtained by in advance performing an evaluation experiment about the authentication precision by using a large number of sample data. A case where the narrowing rate p is equivalent to or less than the threshold value has the same meaning as a fact that the confirmation collation score is equivalent to or more than a prescribed threshold value.

$$\text{Narrowing rate } p = f(\text{confirmation collation score}) \quad (1)$$

Second Embodiment

In the first embodiment, a description is made about an example where the narrowing data of the registration data are updated. However, in a second embodiment, a description will be made about an example where the narrowing data are newly added to the registration data. A configuration of a biometric authentication device according to the second embodiment is similar to the configuration described with FIG. 2 and FIG. 3.

Figure 9A:
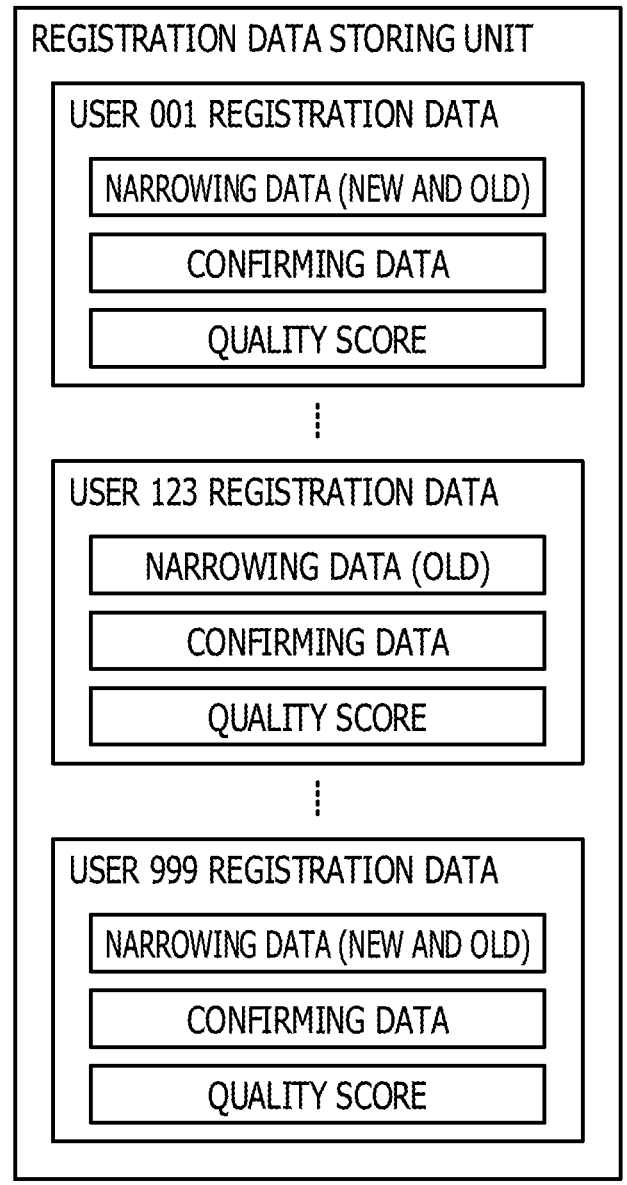
FIG. 9A is a diagram that exemplifies the registration data that are stored in the registration data storing unit.

FIG. 9A is a diagram that exemplifies the registration data that are stored in the registration data storing unit 22. As exemplified in FIG. 9A, as for the registration data stored in the registration data storing unit 22, the narrowing data, the confirming data, and the quality scores are stored while being associated with the respective user IDs. There are two kinds of narrowing data, which are the narrowing data (old scheme) and the narrowing data (new scheme). There are a case where only the narrowing data (old scheme) are stored, a case where only the narrowing data (new scheme) are stored, and a case where both of those are stored. The old scheme and the new scheme are different in algorithms in a case where the narrowing data are extracted from the biometric data acquired from the living body sensor 105. For example, the narrowing data in the new scheme may extract the biometric characteristic with high precision and thus improves narrowing process precision. For example, the narrowing rate may be reduced. Accordingly, the confirmation collation process may be shortened. Alternatively, the narrowing data in the new scheme have a less information amount and may thus shorten the time requested for the narrowing process.

Figure 9B:
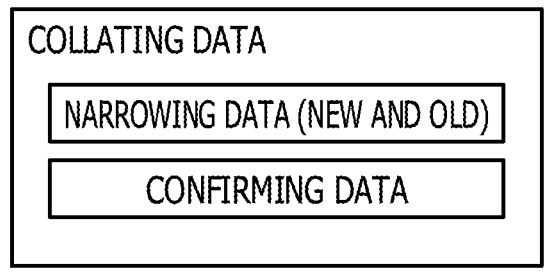
FIG. 9B is a diagram that exemplifies narrowing data and confirming data which are extracted from collating biometric data in step S2 and step S3 in FIG. 5.

FIG. 9B is a diagram that exemplifies the narrowing data and the confirming data which are extracted from the collating biometric data in step S2 and step S3 in FIG. 5. As exemplified in FIG. 9B, in this embodiment, the two kinds of narrowing data, which are the narrowing data (old scheme) and the narrowing data (new scheme), are extracted.

In the second embodiment also, the processes of FIG. 5 and FIG. 6 are performed in the authentication process. However, in step S2 in FIG. 5, the narrowing unit 14 extracts the narrowing data (old scheme) and the narrowing data (new scheme) from the collating biometric data stored in the biometric data storage unit 13, collates either kind of the narrowing data with the narrowing data in the same scheme stored in the registration data storing unit 22, and thereby extracts the candidates. The narrowing unit 14 may select the narrowing data (old scheme) or the narrowing data (new scheme), which are extracted from the collating biometric data, in response to the kind of the narrowing data included in the registration data or the quality score.

Figure 10:
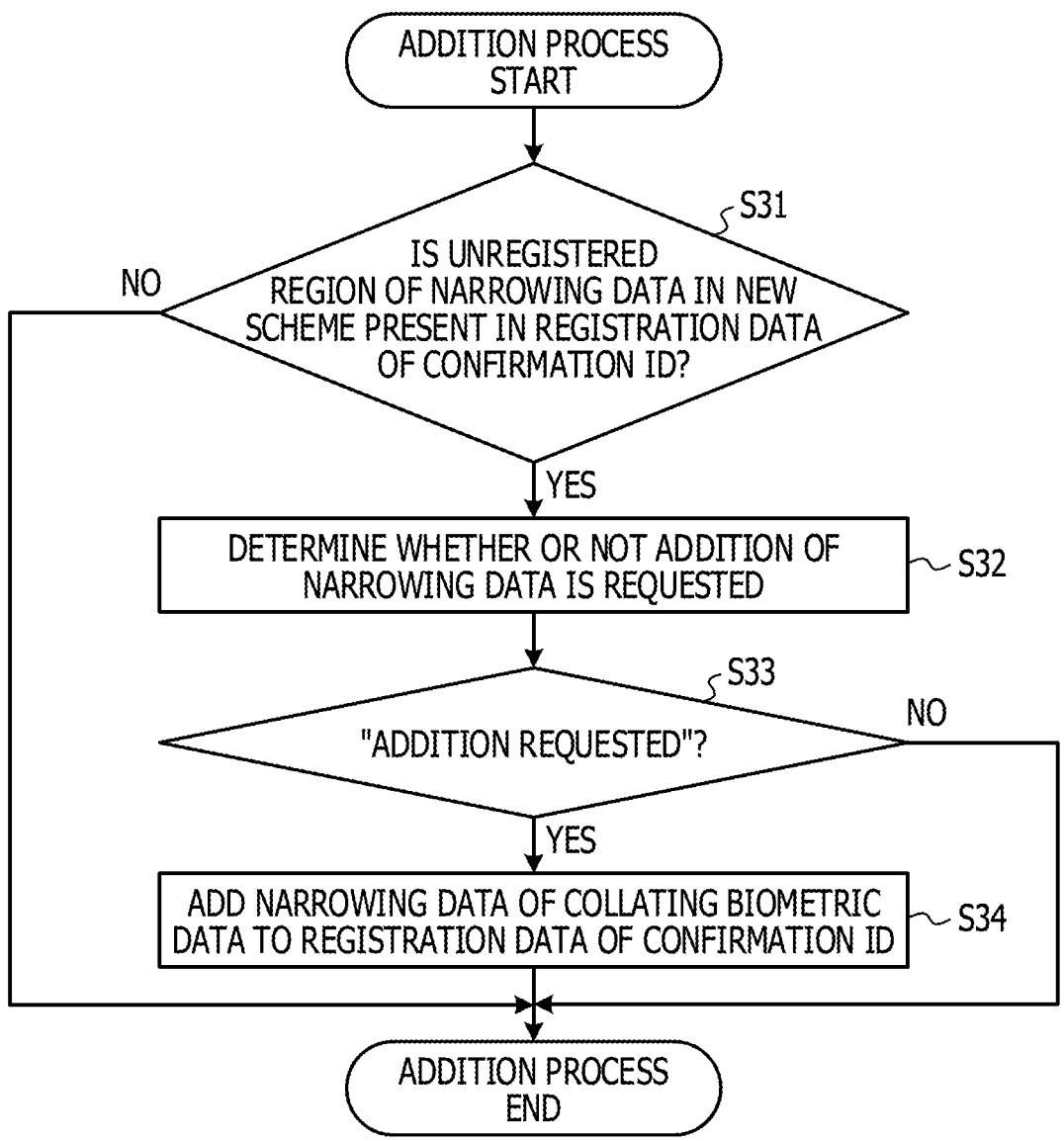
FIG. 10 is a diagram that exemplifies a flowchart which illustrates step S5 in FIG. 5.

In a case where collation is performed with the narrowing data (old scheme) of the registration data in the narrowing process for the confirmation ID, a process of FIG. 10 is performed instead of a process of FIG. 7. FIG. 10 is a diagram that exemplifies a flowchart which illustrates details of step S5 in FIG. 5. As exemplified in FIG. 10, the determination unit 19 determines whether or not an unregistered region of the narrowing data (new scheme) is present in the registration data of the confirmation ID output in step S16 in FIG. 6 (step S31). In a case where a determination in step S31 is "No", the flowchart of FIG. 10 is finished.

In a case where the determination in step S31 is "Yes", the determination unit 19 applies the confirmation collation score to the rule stored in the rule storing unit 20 and determines whether or not addition of the narrowing data (new scheme) is requested (step S32). For example, in a case where the confirmation collation score is equivalent to or more than the quality score, a determination is made that an update is "requested". Next, the determination unit 19 determines whether or not the determination about whether or not the addition of the narrowing data (new scheme) is requested is "requested" (step S33). In a case where a determination in step S33 is "No", the flowchart of FIG. 10 is finished. In a case where the determination in step S33 is "Yes", the registration unit 21 stores the narrowing data (new scheme) extracted from the collating biometric data in the unregistered region of the registration data of the confirmation ID (step S34). The flowchart is thereafter finished.

On the other hand, in a case where collation is performed with the narrowing data (new scheme) of the registration data in the narrowing process for the confirmation ID, the process of FIG. 7 is performed. However, the narrowing data to be updated are in the new scheme.

In this embodiment, the narrowing data in the new scheme are added in a case where the confirmation collation score is equivalent to or more than a threshold value. When the new scheme realizes the narrowing process with high precision, the narrowing process is performed by using the narrowing data in the new scheme, and precision of the narrowing process is thereby improved. As a result, authentication precision is improved. When the new scheme may reduce the narrowing rate, the candidates obtained by the narrowing process become fewer. Accordingly, confirmation collation may be shortened. When the narrowing data in the new scheme have a small information amount, the time requested for the narrowing process may be shortened.

Third Embodiment

Figure 11:
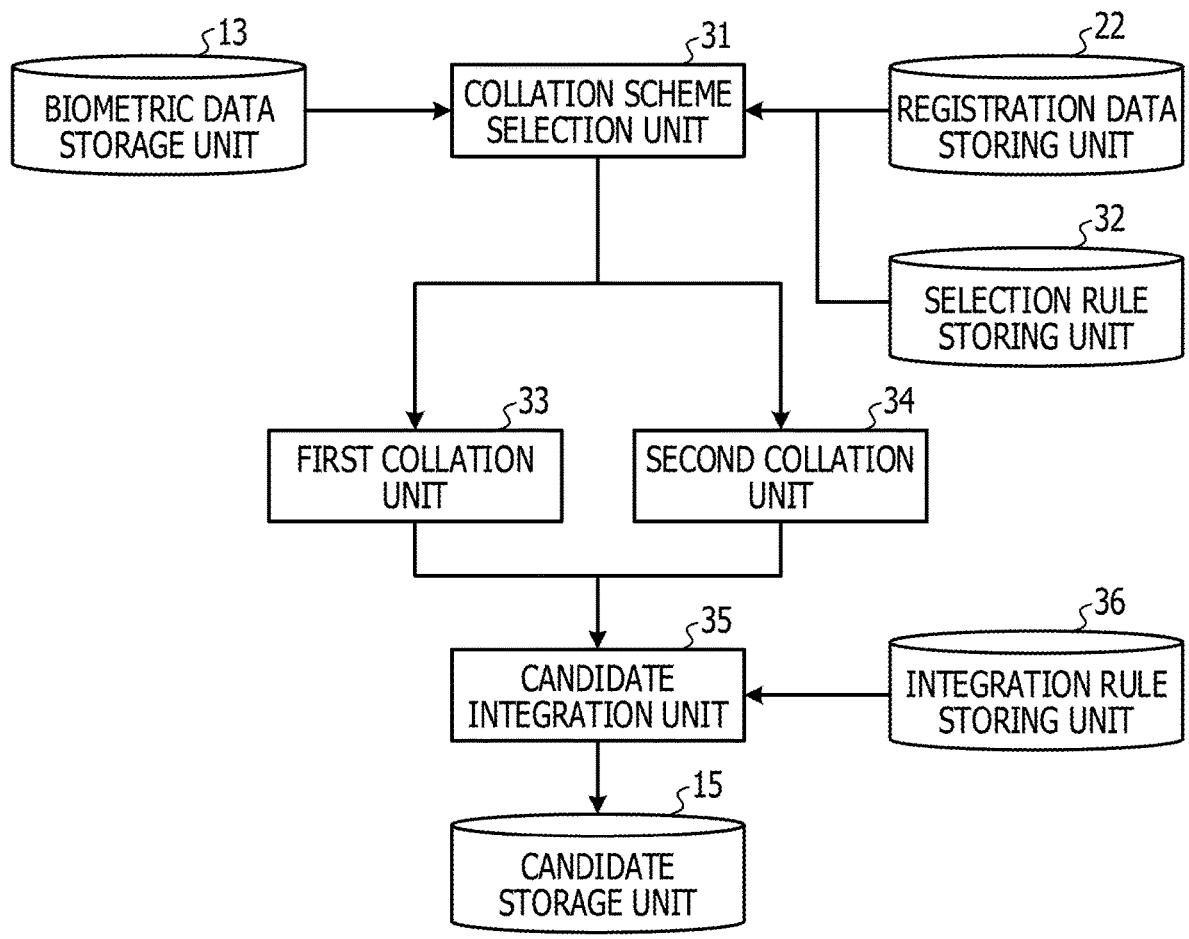
FIG. 11 is a detailed block diagram of a narrowing unit.

In a third embodiment, the second embodiment will more specifically be described. FIG. 11 is a detailed block diagram of the narrowing unit 14. As exemplified in FIG. 11, in this embodiment, the narrowing unit 14 includes a collation scheme selection unit 31, a selection rule storing unit 32, a first collation unit 33, a second collation unit 34, a candidate integration unit 35, an integration rule storing unit 36, and so forth.

Figure 12:
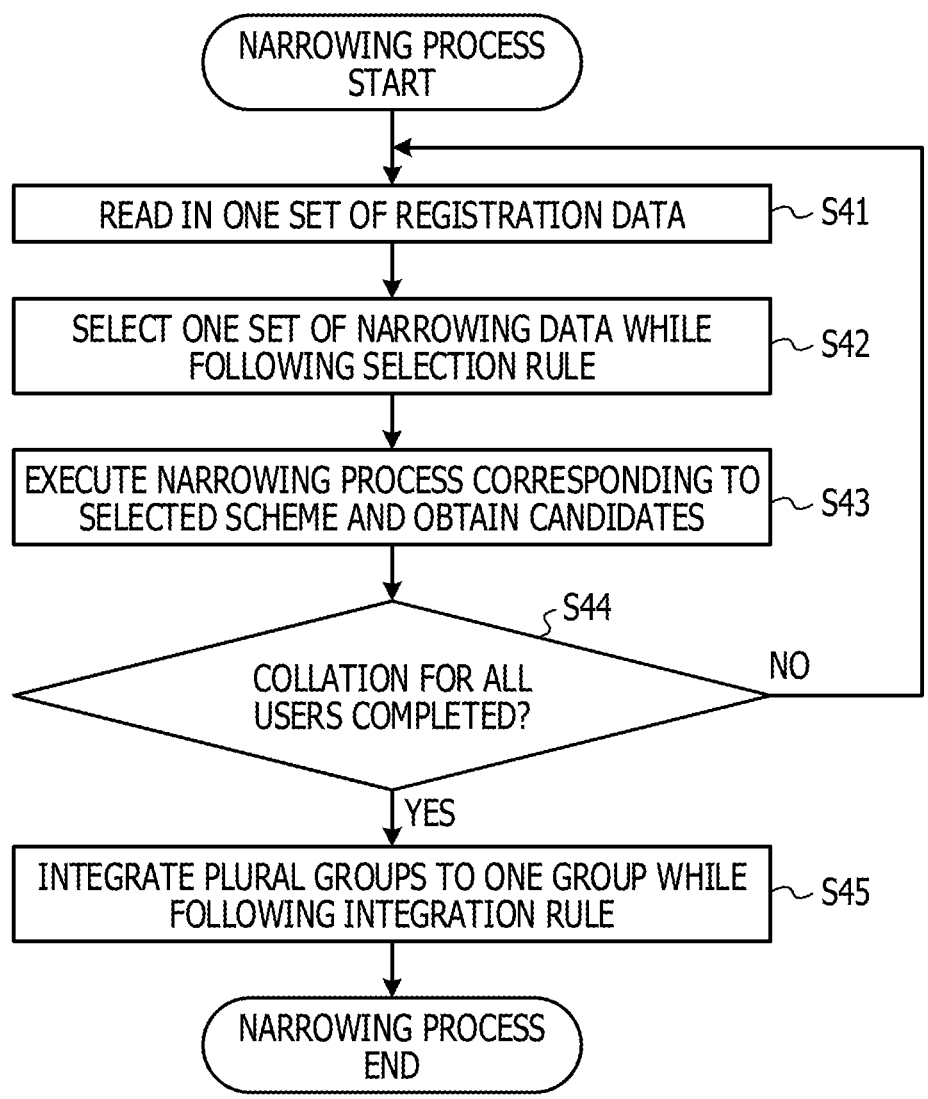
FIG. 12 is a diagram that exemplifies a flowchart which illustrates the narrowing process.

FIG. 12 is a diagram that exemplifies a flowchart which illustrates the narrowing process according to this embodiment. As exemplified in FIG. 12, the collation scheme selection unit 31 reads in one set of registration data of the user ID, which is stored in the registration data storing unit 22 (step S41). Next, the collation scheme selection unit 31 selects one set of narrowing data for the user ID that is read in in step S41 while following a selection rule stored in the selection rule storing unit 32 (step S42). For example, depending on the user ID, the narrowing data (new scheme) may be selected, or the narrowing data (old scheme) may be selected.

Next, in a case where the narrowing data (new scheme) are selected in step S42, the first collation unit 33 collates the narrowing data (new scheme) of the collating biometric data with the narrowing data (new scheme) selected in step S42. In a case where the narrowing data (old scheme) are selected in step S42, the second collation unit 34 collates the narrowing data (old scheme) of the collating biometric data with the narrowing data (old scheme) selected in step S42. The first collation unit 33 obtains candidates (first group) based on the collation result. The second collation unit 34 obtains candidates (second group) based on the collation result (step S43).

Next, the first collation unit 33 and the second collation unit 34 determine whether or not collation for all the user IDs is finished (step S44). In a case where a determination in step S44 is "No", the process is again executed from step S41. In this case, the registration data of the user IDs, which are not yet read in, are read in. In a case where the determination in step S44 is "Yes", the candidate integration unit 35 integrates the first group and the second group together while following an integration rule stored in the integration rule storing unit 36 (step S45). Obtained integrated candidates are stored in the candidate storage unit 15.

Figure 13:
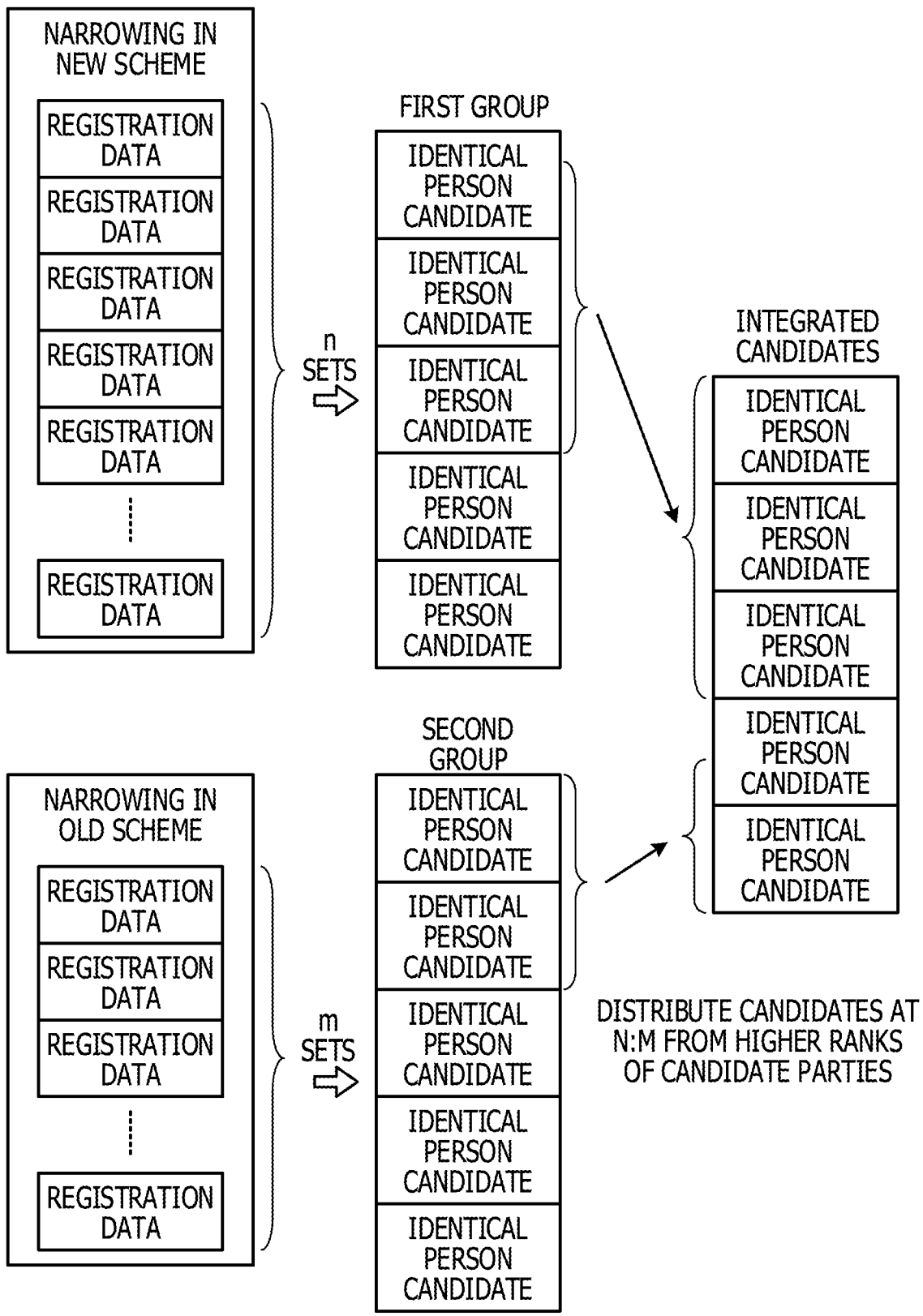
FIG. 13 is a diagram that exemplifies integration of candidates.
Figure 14:
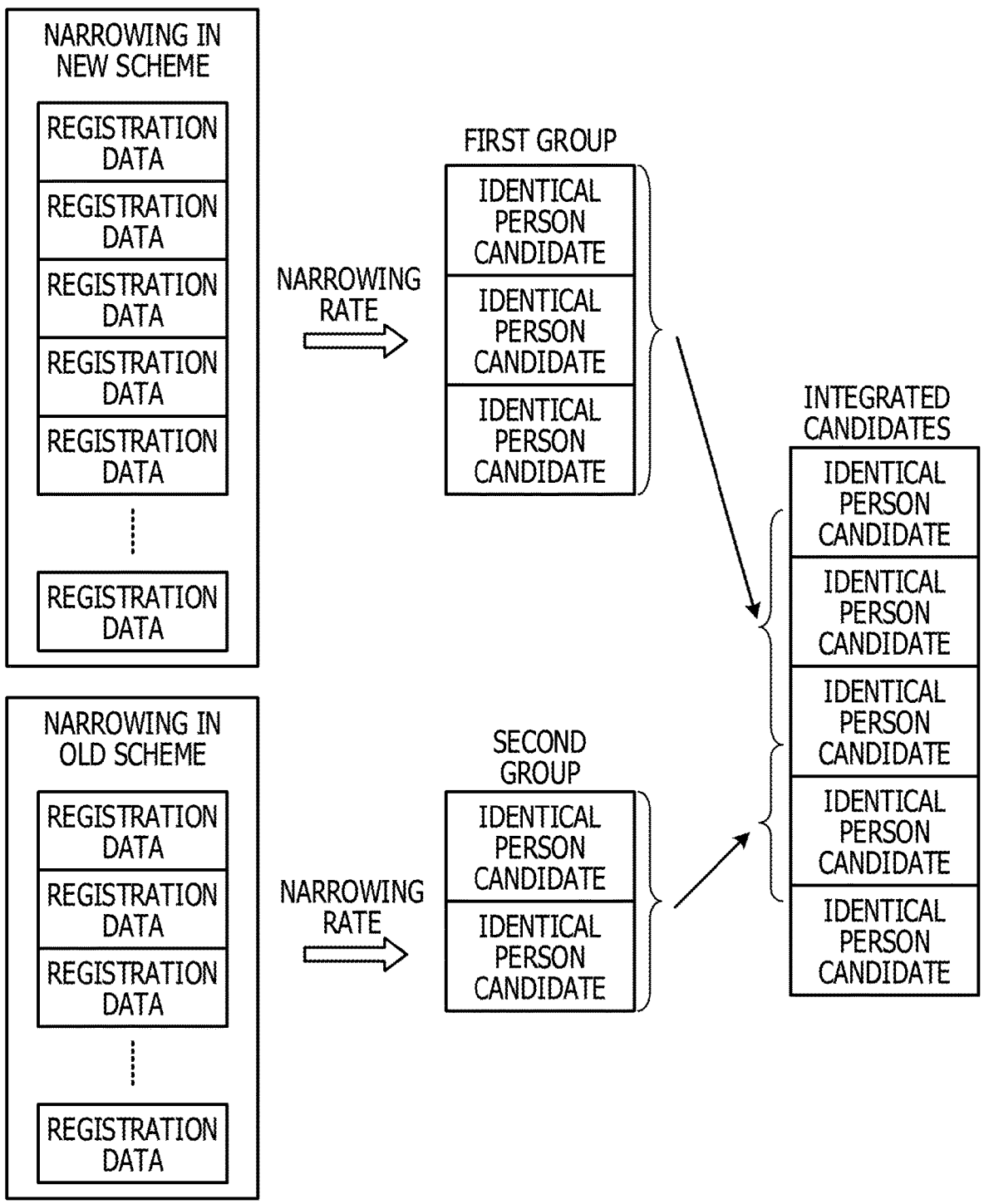
FIG. 14 is a diagram that exemplifies integration of candidates.

For example, the first group and the second group are simply coupled together, and one candidate group may thereby be obtained. As exemplified in FIG. 13, a method may be used which integrates the candidates who are selected from higher ranks of the respective groups in accordance with the proportional distribution at the ratio between the numbers of sets of registration data that are processed in obtaining the respective groups. Alternatively, a method may be used which distributes the candidates of the respective groups at the narrowing rates that are predetermined for the respective sets of narrowing data.

Modification Example

There may be more schemes of the narrowing data than the two kinds that are the old scheme and the new scheme. For example, the narrowing data in at least any collation scheme of three or more kinds of collation schemes may be stored in the registration data storing unit 22 while being associated with the user IDs. For example, the narrowing data in at least any one of collation scheme of four kinds of collation schemes, which are a scheme A to a scheme D, may be stored. In this case, the selection rule stored in the selection rule storing unit 32 may be set as a rule for selecting the collation scheme with high priority. For example, as exemplified in FIG. 15, when the priority is defined for each of the collation schemes, the collation scheme is selected in accordance with the priority.

Alternatively, the quality scores of plural sets of narrowing data included in the registration data are used to estimate the narrowing rates based on a relational expression between the quality score and the narrowing rate such as the above formula (1), and a rule for selecting the narrowing data with the lower narrowing rate (which may narrow the candidates to fewer candidates) may thereby be set.

Figure 16:
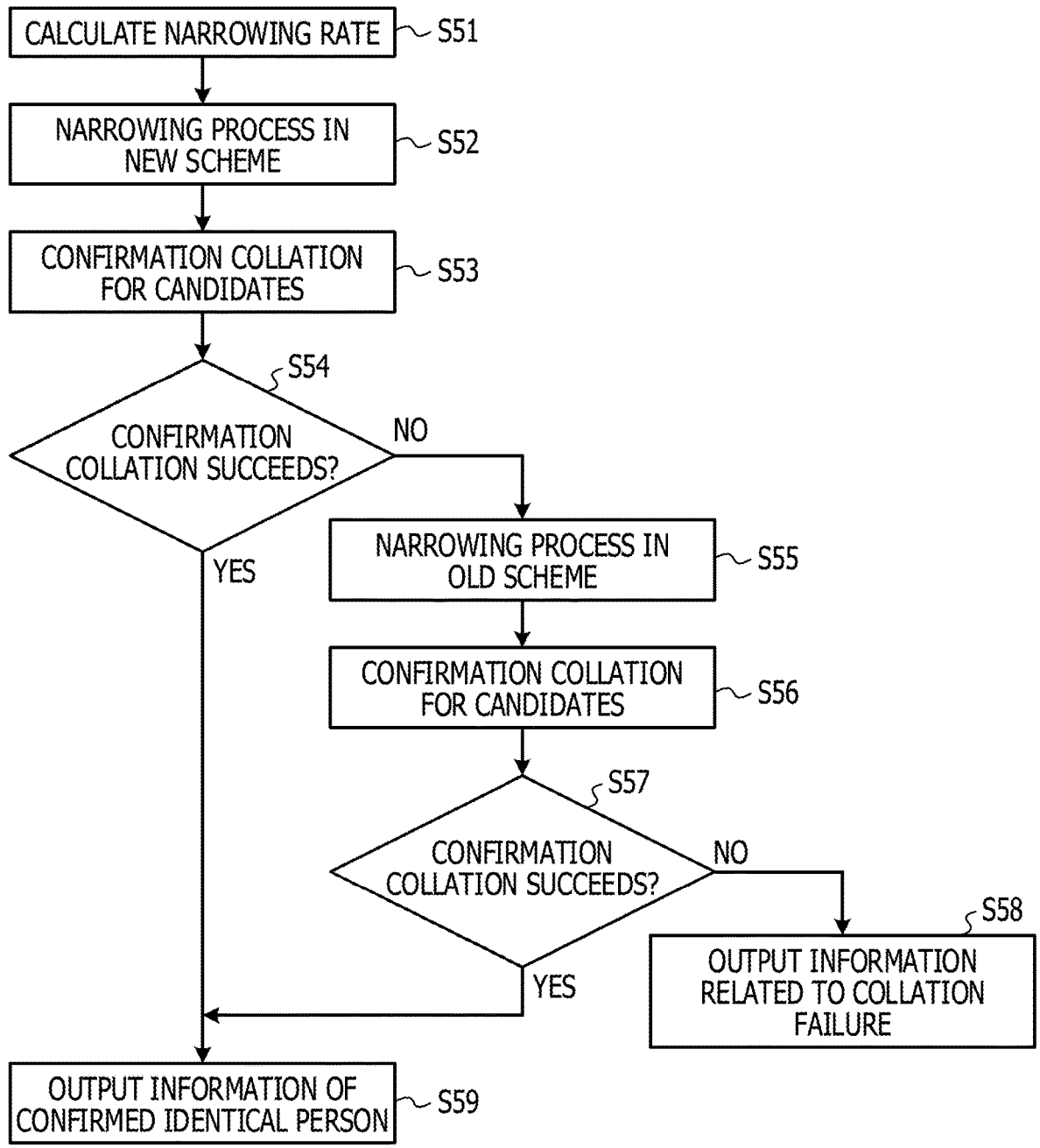
FIG. 16 is a diagram that exemplifies a flowchart which illustrates the authentication process in a case where the narrowing rate is made variable.

FIG. 16 is a diagram that exemplifies a flowchart which illustrates the authentication process in a case where the narrowing rate is made variable. As exemplified in FIG. 16, the narrowing unit 14 calculates a threshold value of the narrowing process (narrowing rate) by using the quality score of the registration data (step S51). In this case, the narrowing unit 14 uses a statistic such as an average value, a maximum value, a minimum value, or a median of the quality score of the registration data. A predetermined formula or the like may be used for conversion from the quality score to the narrowing rate.

Next, the first collation unit 33 collates the narrowing data (new scheme) of the collating biometric data with the narrowing data (new scheme) among the sets of registration data stored in the registration data storing unit 22 (step S52). Accordingly, the first collation unit 33 obtains the candidates (first group). The narrowing rate calculated in step S51 is used. Next, the confirmation collation unit 16 collates the confirming data of the collating biometric data with the confirming data of the registration data of the first group (step S53). The confirmation collation unit 16 determines whether or not the confirmation collation in step S53 succeeds (step S54). In a case where a determination in step S54 is "Yes", execution of the flowchart is finished (step S59).

In a case where the determination in step S54 is "No", the second collation unit 34 collates the narrowing data (old scheme) of the collating biometric data with the narrowing data (old scheme) among the sets of registration data stored in the registration data storing unit 22 (step S55). Accordingly, the second collation unit 34 obtains the candidates (second group). The narrowing rate calculated in step S51 is used. Next, the confirmation collation unit 16 collates the confirming data of the collating biometric data with the confirming data of the registration data of the second group (step S56). Next, the confirmation collation unit 16 determines whether or not the confirmation collation in step S56 succeeds (step S57). In a case where a determination in step S57 is "Yes", execution of the flowchart is finished (step S59). In a case where the determination in step S57 is "No", the output unit 18 outputs information related to collation failure (step S58). That is, the output unit 18 outputs information that indicates that the target person is not present in the users stored in the registration data storing unit 22, for example.

The narrowing rate is made variable, and a highly flexible narrowing process may thereby be realized. The narrowing rate is made variable in accordance with the quality score, and the narrowing rate may thereby be reduced in a case where the quality of the narrowing data of the registration data is high.

In each of the above examples, the registration data storing unit 22 functions as one example of a registration data storing unit that stores the narrowing data and the confirming data, which are associated with each of plural users, as the registration data. The narrowing unit 14 functions as one example of a narrowing unit that collates the narrowing data extracted from the collating biometric data acquired from the person to be authenticated with the narrowing data of each of the users, which are stored in the registration data storing unit, and thereby obtains fewer candidates than the number of plural users. The confirmation collation unit 16 functions as one example of a confirmation collation unit that confirms a specific candidate from the candidates in accordance with the respective pieces of similarity between the confirming data extracted from the collating biometric data and the confirming data of the registration data related to the candidates among the registration data stored in the registration data storing unit. In a case where the similarity of the specific candidate is equivalent to or more than a threshold value, the registration unit 21 functions as one example of a registration unit that registers the narrowing data extracted from the collating biometric data in the registration data of the specific candidate.

In the foregoing, the embodiments of the present disclosure have been described in detail. However, the present disclosure is not limited to such specific embodiments, but various modifications and alterations are possible within the scope of the gist of the present disclosure that is described in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
a memory; and
a processor coupled to the memory and configured to,
   store, for each of users, confirming data and pieces of narrowing data, which each has less information amount than the confirming data and are generated by different kinds of collation schemes, in associated with each other, as registration data in the memory, obtain a plurality of candidate groups each including one or more candidates and corresponding to the different kinds of collation schemes by collating the pieces of narrowing data which are generated using the different kinds of collation schemes based on collating biometric data which is acquired from a person to be authenticated with the pieces of narrowing data of each of the users in the memory, obtain candidates having a fewer number than a number of the users by integrating the plurality of candidate groups, confirm a specific candidate from the candidates in response to respective pieces of similarity between the confirming data which is extracted from the collating biometric data and the confirming data of the registration data related to the candidates in the memory, and register the pieces of narrowing data extracted from the collating biometric data in the registration data of the specific candidate in a case where the similarity of the specific candidate is equivalent to or more than a threshold value.

2. The information processing device according to claim 1, wherein a score of the pieces of narrowing data is stored as the registration data in the memory with respect to each of the users, and the processor is configured to register the pieces of narrowing data extracted from the collating biometric data in the registration data of the specific candidate and update the score associated with the specific candidate with the similarity of the specific candidate in a case where the similarity of the specific candidate and the score associated with the specific candidate satisfy a condition.

3. The information processing device according to claim 1, wherein the pieces of narrowing data in the different kinds of collation schemes are stored in the memory for each of the users, and the processor is configured to add the pieces of narrowing data extracted from the collating biometric data to the registration data of the specific candidate or update the registration data of the specific candidate with the pieces of narrowing data extracted from the collating biometric data.

4. The information processing device according to claim 3, wherein the processor is configured to: extract the pieces of narrowing data in the different kinds of collation schemes from the collating biometric data, and perform collation with the pieces of narrowing data in the same or similar kind of collation scheme among the pieces of narrowing data of the users in the memory.

5. The information processing device according to claim 4, wherein the processor is configured to perform collation with the pieces of narrowing data extracted from the collating biometric data according to the different kinds of the collation schemes of the pieces of narrowing data included in the registration data, for to each of the users.

6. The information processing device according to claim 4, wherein the processor is configured to obtain the candidate groups for each of the kinds of the collation schemes and integrates the candidate groups according to a rule.

7. The information processing device according to claim 1, wherein the processor is configured to make a narrowing rate variable based on the registration data stored in the memory.

8. A biometric authentication method comprising:

storing, by a computer, for each of users, confirming data and pieces of narrowing data, which each has less information amount than the confirming data and are generated by different kinds of collation schemes, in associated with each other, as registration data in the memory, obtaining a plurality of candidate groups each including one or more candidates and corresponding to the different kinds of collation schemes by collating the pieces of narrowing data which are generated using the different kinds of collation schemes based on collating biometric data which is acquired from a person to be authenticated with the pieces of narrowing data of each of the users in the memory, obtaining candidates having a fewer number than a number of the users by integrating the plurality of candidate groups, confirming a specific candidate from the candidates in response to respective pieces of similarity between the confirming data which is extracted from the collating biometric data and the confirming data of the registration data related to the candidates in the memory, and registering the pieces of narrowing data extracted from the collating biometric data in the registration data of the specific candidate in a case where the similarity of the specific candidate is equivalent to or more than a threshold value.

9. The biometric authentication method according to claim 8, wherein a score of the pieces of narrowing data is stored as the registration data in the memory with respect to each of the users, and the biometric authentication method further includes: registering the pieces of narrowing data extracted from the collating biometric data in the registration data of the specific candidate and updating the score associated with the specific candidate with the similarity of the specific candidate in a case where the similarity of the specific candidate and the score associated with the specific candidate satisfy a condition.

10. The biometric authentication method according to claim 8, wherein the pieces of narrowing data in the different kinds of collation schemes are stored in the memory for each of the users, and the biometric authentication method further includes: adding the pieces of narrowing data extracted from the collating biometric data to the registration data of the specific candidate or updating the registration data of the specific candidate with the pieces of narrowing data extracted from the collating biometric data.

11. The biometric authentication method according to claim 10, further comprising: extracting the pieces of narrowing data in the different kinds of collation schemes from the collating biometric data, and performing collation with the pieces of narrowing data in the same or similar kind of collation scheme among the pieces of narrowing data of the users in the memory.

12. The biometric authentication method according to claim 11, further comprising: performing collation with the pieces of narrowing data extracted from the collating biometric data according to the different kinds of the collation schemes of the pieces of narrowing data included in the registration data, for to each of the users.

13. The biometric authentication method according to claim 11, further comprising: obtaining the candidate groups for each of the kinds of the collation schemes and integrates the candidate groups according to a rule.

14. The biometric authentication method according to claim 8, further comprising: making a narrowing rate variable based on the registration data stored in the memory.

15. A non-transitory computer-readable recording medium recording a biometric authentication program which causes a computer to execute a process, the process comprising:

storing for each of users, confirming data and pieces of narrowing data, which each has less information amount than the confirming data and are generated by different kinds of collation schemes, in associated with each other, as registration data in the memory, obtaining a plurality of candidate groups each including one or more candidates and corresponding to the different kinds of collation schemes by collating the pieces of narrowing data which are generated using the different kinds of collation schemes based on collating biometric data which is acquired from a person to be authenticated with the pieces of narrowing data of each of the users in the memory, obtaining candidates having a fewer number than a number of the users by integrating the plurality of candidate groups, confirming a specific candidate from the candidates in response to respective pieces of similarity between the confirming data which is extracted from the collating biometric data and the confirming data of the registration data related to the candidates in the memory, and registering the pieces of narrowing data extracted from the collating biometric data in the registration data of the specific candidate in a case where the similarity of the specific candidate is equivalent to or more than a threshold value.

16. The non-transitory computer-readable recording medium according to claim 15, wherein a score of the pieces of narrowing data is stored as the registration data in the memory with respect to each of the users, and the process further includes: registering the pieces of narrowing data extracted from the collating biometric data in the registration data of the specific candidate and updating the score associated with the specific candidate with the similarity of the specific candidate in a case where the similarity of the specific candidate and the score associated with the specific candidate satisfy a condition.

17. The non-transitory computer-readable recording medium according to claim 15, wherein the pieces of narrowing data in the different kinds of collation schemes are stored in the memory for each of the users, and the process further includes: adding the pieces of narrowing data extracted from the collating biometric data to the registration data of the specific candidate or updating the registration data of the specific candidate with the pieces of narrowing data extracted from the collating biometric data.

18. The non-transitory computer-readable recording medium according to claim 17, further comprising: extracting the pieces of narrowing data in the different kinds of collation schemes from the collating biometric data, and performing collation with the pieces of narrowing data in the same or similar kind of collation scheme among the pieces of narrowing data of the users in the memory.

19. The non-transitory computer-readable recording medium according to claim 18, further comprising: performing collation with the pieces of narrowing data extracted from the collating biometric data according to the different kinds of the collation schemes of the pieces of narrowing data included in the registration data, for to each of the users.

20. The non-transitory computer-readable recording medium according to claim 18, further comprising: obtaining the candidate groups for each of the kinds of the collation schemes and integrates the candidate groups according to a rule.

* * * * *